(12) United States Patent
Ueda et al.

(10) Patent No.: US 8,160,429 B2
(45) Date of Patent: Apr. 17, 2012

(54) VIDEO IMAGE DATA COMPRESSION ARCHIVER AND METHOD FOR VIDEO IMAGE DATA COMPRESSION

(75) Inventors: Hiroaki Ueda, Tokyo (JP); Ryuji Satou, Tokyo (JP)

(73) Assignee: NEC Personal Computers, Ltd., Tokyo (JP)

( * ) Notice: Subject to any disclaimer, the term of this patent is extended or adjusted under 35 U.S.C. 154(b) by 1399 days.

(21) Appl. No.: 10/614,422

(22) Filed: Jul. 7, 2003

(65) Prior Publication Data

US 2004/0008767 A1    Jan. 15, 2004

(30) Foreign Application Priority Data

Jul. 9, 2002  (JP) .................................. 2002-199493

(51) Int. Cl.
*H04N 5/92* (2006.01)
(52) U.S. Cl. ........................................................ 386/326
(58) Field of Classification Search .................. 386/109, 386/112, 101
See application file for complete search history.

(56) References Cited

U.S. PATENT DOCUMENTS 6,144,797 A * 11/2000 MacCormack et al. ...... 386/224
2002/0163964 A1 * 11/2002 Nichols ..................... 375/240.03

FOREIGN PATENT DOCUMENTS

| JP | 11-39846 | 2/1999 |
| JP | 2000-23155 | 1/2000 |
| JP | 2000-050186 | 2/2000 |
| JP | 2000-333169 | 11/2000 |
| JP | 2000-341627 | 12/2000 |
| JP | 2002-27479 | 1/2002 |
| JP | 2002-171487 | 6/2002 |

* cited by examiner

*Primary Examiner* — William C Vaughn, Jr.
*Assistant Examiner* — Daniel Tekle
(74) *Attorney, Agent, or Firm* — Scully, Scott, Murphy & Presser, P.C.

(57) ABSTRACT

A video image data compression archiver is composed of an encoder and an encoder controller. The encoder compresses non-compressed video image data to generate compressed video image data. The encoder controller is connected to said encoder to control a frame size, a frame rate, and an average bit rate of said compressed video image data in response to at least one parameter selected from a group consisting of a number of frames of said non-compressed video image data, a recording time of said non-compressed video image data, and a free area of a recording medium for recording said compressed video image data.

27 Claims, 10 Drawing Sheets

Fig. 2

| FRAME SIZE \ FRAME RATE | 10 | 20 | 30 |
|---|---|---|---|
| 120 × 120 | 1.0Mbps | 2.0Mbps | 3.0Mbps |
| 300 × 200 | 4.0Mbps | 5.0Mbps | 6.0Mbps |
| 360 × 240 | 7.0Mbps | 8.0Mbps | 9.0Mbps |

Column headers labeled 9-1, 9-2, 9-3. Row labels: 8-1, 8-2, 8-3.

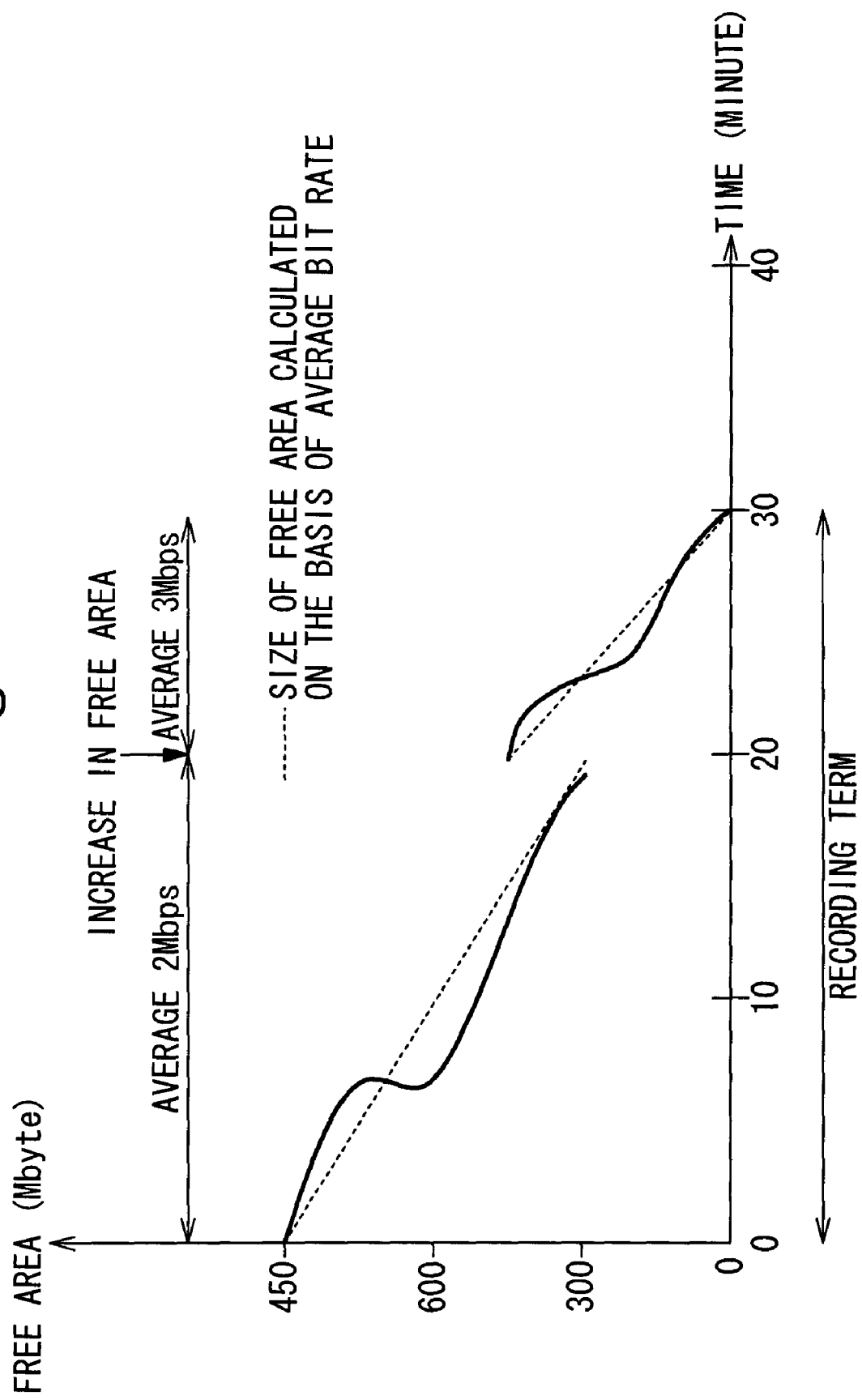

VIDEO IMAGE DATA COMPRESSION ARCHIVER AND METHOD FOR VIDEO IMAGE DATA COMPRESSION

BACKGROUND OF THE INVENTION

1. Field of the Invention

The present invention is related, in general, to a video image data archiver, in particular to a video image data archiver which compresses video image data, and stores the compressed video image data in a recording medium.

2. Description of the Related Art

Storing video image data in a recording medium, such as a CD-ROM (compact disc read only memory) and a hard disk drive, often requires compression of the video image data, because of the large size thereof. Compression of video image data is often achieved by DCT (discrete cosine transformation). The data compression techniques using DCT have been widely used as internationally standardized data compression methods, such as MPEG1 (moving picture expert group 1) and MPEG2.

Japanese unexamined patent application No. P2000-333169A discloses a video image data encoder which allows video image data to be recorded in a recording medium at variable bit rates so that the quality of the recorded moving picture is appropriately controlled.

The disclosed video image data encoder executes real-time record of a video image data at variable bit rates into a storage medium which has a fixed storage capacity. The video image data encoder includes a controller, a quantizer, and an inverse-quantizer. The controller disposed obtains a size and a recording time of original data to be sequentially recorded in the storage medium. The controller determines the remaining storage capacity and recording time of the storage medium and calculates the subsequent target bit rate. The controller controls a quantization step size used by the quantizer 111 and an inverse-quantizer so that the variable bit rate of the record data does not exceed the target bit rate.

Other techniques for compressing moving picture data with variable bit rates are disclosed in Japanese Unexamined Patent Application No. P2000-23155A, P2000-341627, and P2002-27479.

An video image data is to be compressed so that the whole of the compressed video image data is surely stored in a recording medium whose storage capacity is finite. This may be achieved by reducing data size of the compressed video data. However, reducing data size is often undesirably accompanied by degradation of the image quality.

Therefore, a need exists to provide a video image data compression archiver which enables the whole of the compressed video image data to be recorded in a recording medium while improving the image quality of the compressed video image data as far as possible.

Especially, this is the case when the remaining storage capacity of the recording medium is suddenly increased or decreased. As for the case when a hard disk drive is used as a recording medium in a computer system, for example, the free area of the hard disk drive may be increased or decreased by an application used in the computer system. It would be advantageous if a video image data compression archiver develops compressed video image data to surely store the whole of it in a recording medium, so that the image quality of the compressed video image data is appropriately adjusted in response to the storage capacity of the recording medium being suddenly increased or decreased.

The same goes for a sudden change in a recording time and/or a number of frames of video image data to be archived.

As for the case that video image data of a broadcast of a baseball game is archived in a recording medium, for example, the recording time and the number of the frames of the video image data may be suddenly increased because of the extra inning(s) of the baseball game. It would be advantageous if a video image data compression archiver develops compressed video image data to surely store the whole of it in a recording medium, so that the image quality of the compressed video image data is appropriately adjusted in response to the recording time and/or the number of the frames being suddenly increased or decreased.

SUMMARY OF THE INVENTION

Therefore, an object of the present invention is to provide a video image data compression archiver which enables the whole of the compressed video image data to be recorded in a recording medium while improving the image quality of the compressed video image data as far as possible.

In an aspect of the present invention, a video image data compression archiver is composed of an encoder and an encoder controller. The encoder compresses non-compressed video image data to generate compressed video image data. The encoder controller is connected to the encoder to control a frame size, a frame rate, and an average bit rate of the compressed video image data in response to at least one parameter selected from a group consisting of a number of frames of the non-compressed video image data, a recording time of the non-compressed video image data, and a free area of a recording medium for recording the compressed video image data.

Preferably, the encoder controller decides the average bit rate in response to the at least one parameter, and decides the frame size and the frame rate based on the average bit rate.

The encoder controller preferably monitors the free area of the recording medium, and modifies at lease one of the frame size, the frame rate, and the average bit rate when detecting a change in the free area of the recording medium. The encoder controller decreases at least one of the of the frame size, the frame rate, and the average bit rate when detecting a decreases in the free area of the recording medium. On the other hand, the encoder controller increases at least one of the frame size, the frame rate, and the average bit rate when detecting an increase in the free area of the recording medium.

It is also preferable that the encoder controller monitors the number of the frames of the non-compressed video image data, and modifies at lease one of the frame size, the frame rate, and the average bit rate, when detecting a change in the number of the frames of the non-compressed video image data. The encoder controller decreases at least one of the frame size, the frame rate, and the average bit rate, when detecting an increase in the number of the frames of the non-compressed video image data. On the other hand, the encoder controller increases at least one of the frame size, the frame rate, and the average bit rate, when detecting a decrease in the number of the frames of the non-compressed video image data.

It is also preferable that the encoder controller monitors the recording time of the non-compressed video image data, and modifies at lease one of the frame size, the frame rate, and the average bit rate when detecting a change in the recording time. The encoder controller decreases at least one of the frame size, the frame rate, and the average bit rate when detecting an increase in the recording time of the original video image. On the other hand, the encoder controller increases at least one of the frame size, the frame rate, and the average bit rate when detecting a decrease in the recording time of the original video image.

In another aspect of the present invention, a video image data compression archiver is composed of an encoder compressing non-compressed video image data to generate compressed video image data, and an encoder controller connected to the encoder to control a frame size, and an average bit rate of the compressed video image data in response to at least one parameter selected from a group consisting of a number of frames of the non-compressed video image data, a recording time of the non-compressed video image data, and a free area of a recording medium for recording the compressed video image data.

In still another aspect of the present invention, a video image data compression archiver is composed of an encoder compressing non-compressed video image data to generate compressed video image data, and an encoder controller connected to the encoder to control a frame rate, and an average bit rate of the compressed video image data in response to at least one parameter selected from a group consisting of a number of frames of the non-compressed video image data, a recording time of the non-compressed video image data, and a free area of a recording medium for recording the compressed video image data.

In still another aspect of the present invention, a method for archiving video image data is composed of:

compressing non-compressed video image data to generate compressed video image data;

recording the compressed video image data in a recording medium; and controlling an average bit rate, a frame size, and a frame rate of the compressed video image data in response to at least one parameter selected from a group consisting of:

a number of frames of the non-compressed video image data, a recording time of the non-compressed video image data, and a free area of a recording medium for recording the compressed video image data.

In still another aspect of the present invention, a method for archiving video image data is composed of:

compressing non-compressed video image data to generate compressed video image data;

recording the compressed video image data in a recording medium; and controlling an average bit rate, and a frame size of the compressed video image data in response to at least one parameter selected from a group consisting of:

a number of frames of the non-compressed video image data, a recording time of the non-compressed video image data, and a free area of a recording medium for recording the compressed video image data.

In still another aspect of the present invention, a method for archiving video image data is composed of:

compressing non-compressed video image data to generate compressed video image data;

recording the compressed video image data in a recording medium; and controlling an average bit rate, and a frame rate of the compressed video image data in response to at least one parameter selected from a group consisting of:

a number of frames of the non-compressed video image data, a recording time of the non-compressed video image data, and a free area of a recording medium for recording the compressed video image data.

BRIEF DESCRIPTION OF THE DRAWINGS

FIG. 2 shows a table describing an association of average bit rates with frame sizes and frame rates;

FIG. 10 illustrates a change in the size of the free area of the recording medium 7 when the recording time is free area is suddenly increased.

DESCRIPTION OF THE PREFERRED EMBODIMENTS

Preferred embodiments of the present invention are described below in detail with reference to the attached drawings.

First Embodiment

Figure 1:
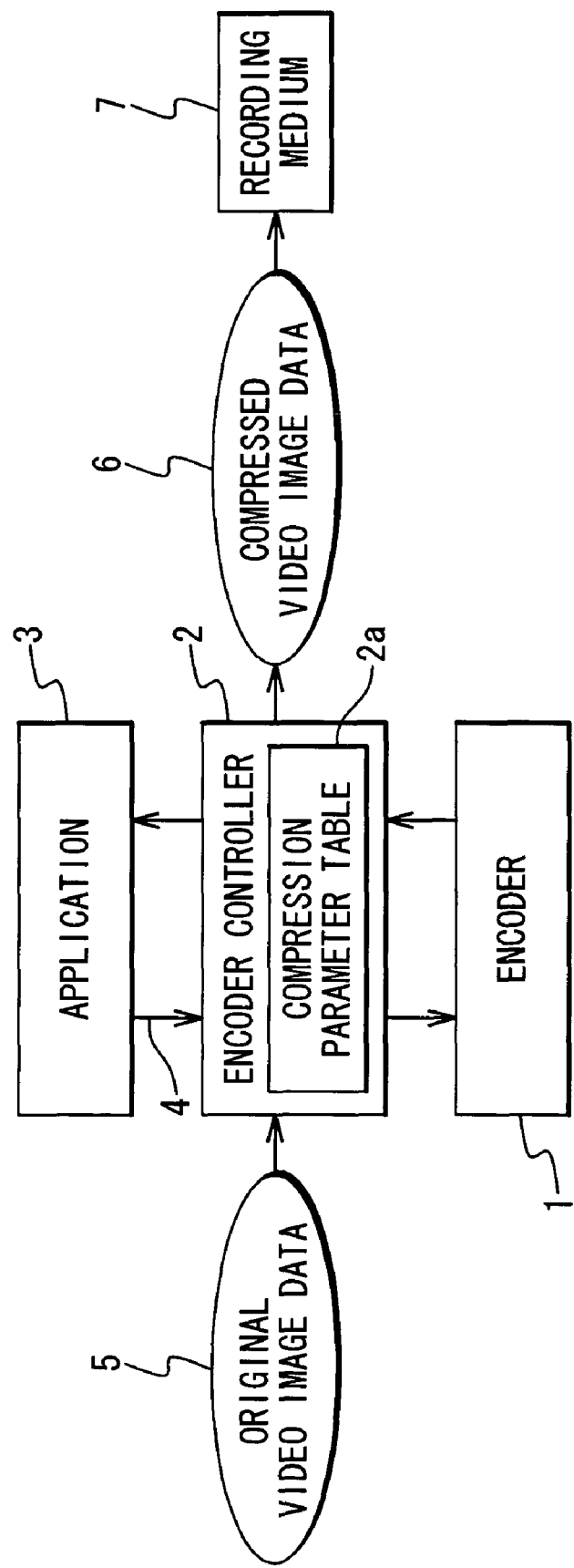
FIG. 1 shows a schematic block diagram of a video image data compression archiver in a first embodiment of the present invention.

In a first embodiment, as shown in FIG. 1, a video image data compression archiver is composed of an encoder 1, and an encoder controller 2. The encoder controller 2 transfer an original video image data 5 to the encoder 1 in response to a data compress request 4 from an application 3, which is software operated by a user. The encoder 1 compresses the original video image data 5 to generate compressed video image data 6. The encoder 1 then outputs the compressed video image data 6 to the encoder controller 2. The bit rate of the compressed video image data 6 is variable. The encoder controller 2 records the compressed video image data 6 in a recording medium 7. The recording medium 7 may be a DRD-RAM (digital video disk-random access memory) or a hard disk drive.

The frame size, the frame rate, and the average bit rate of the compressed video image data 6 are indicated by the encoder controller 2. The encoder controller 2 appropriately decides the frame size, the frame rate, and the average bit rate of the compressed video image data 6 in response to the size of the free area of the recording medium 7 and the number of frames of the original video image data 5.

In order to appropriately decide the frame size, the frame rate, and the average bit rate, the encoder controller 2 stores therein a compression parameter table 2a. FIG. 2 shows the contents of the compression parameter table 2a. The compression parameter table 2a describes an association of the average bit rates with the frame sizes and the frame rates.

Each of rows 8-1 to 8-3 of the compression parameter table 2*a* describes an association of the average bit rates with the frame rates, with respect to a given frame size. The frame rate is to be increased as the increase of the average bit rate when the frame size is assumed to be fixed.

Each of columns 9-1 to 9-3 of the compression parameter table 2*a* describes an association of the average bit rates with the frame sizes, with respect to a given frame rate. The frame size is to be increased as the increase of the average bit rates when the frame rate is assumed to be fixed.

The compression parameter table 2*a* is referred to decide the frame size, the frame rate and the average bit rate of the compressed video image data 6.

Figure 3:
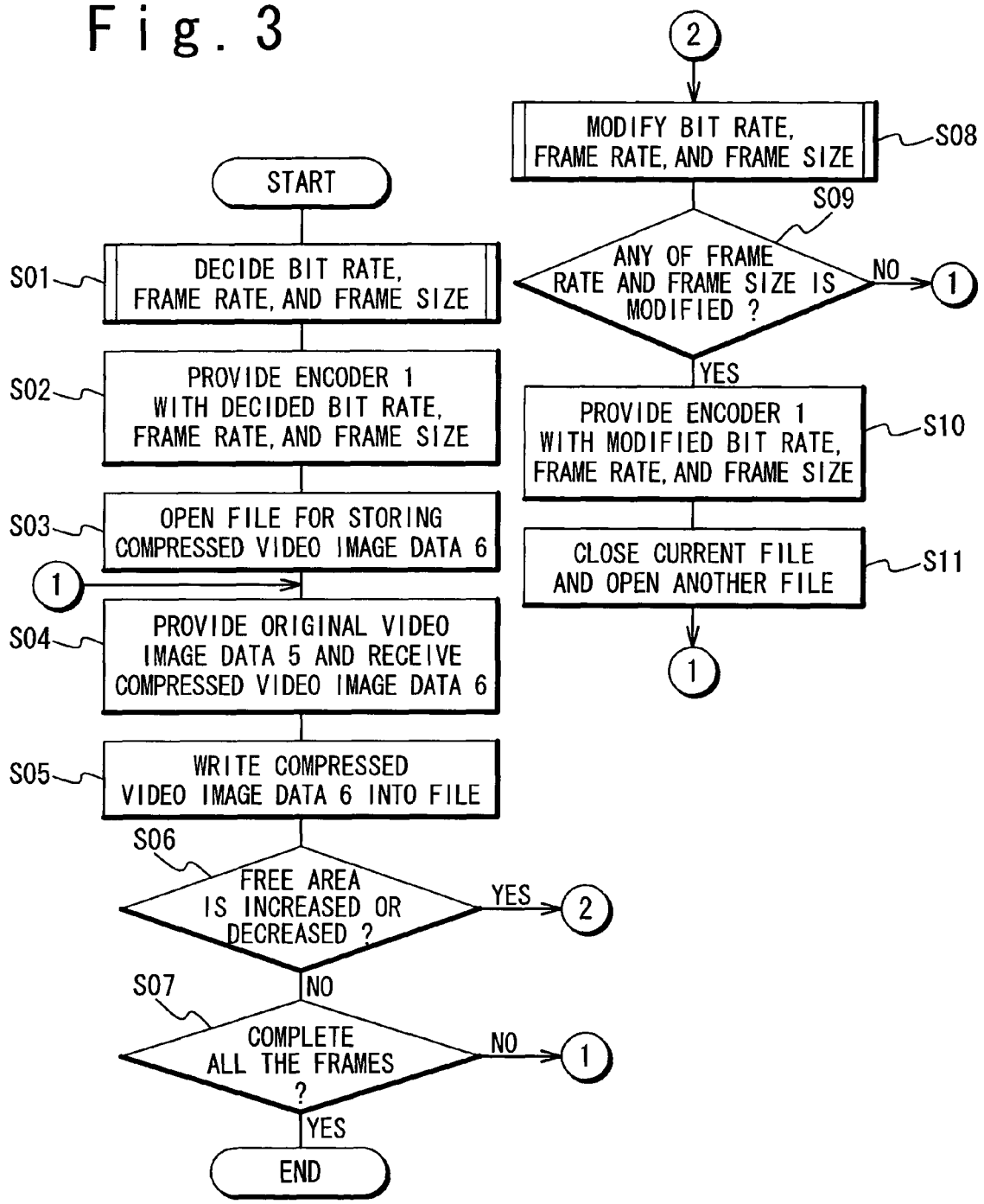
FIG. 3 is a flowchart illustrating an operation of the encoder controller 2 in the first embodiment.

FIG. 3 is a flowchart illustrating an operation of the video image data compression archiver in the first embodiment.

In response to the data compression request 4 from the application 3, the encoder controller 2 obtains the number of frames of the original video image data 5 and the size of the free area of the recording medium 7. The encoder controller 2 then decides the frame size, the frame rate, and the average bit rate of the compressed video image data 6 on the basis of the number of the frames of the original video image data 5 and the size of the free area of the recording medium 7 at Step S01.

Figure 4:
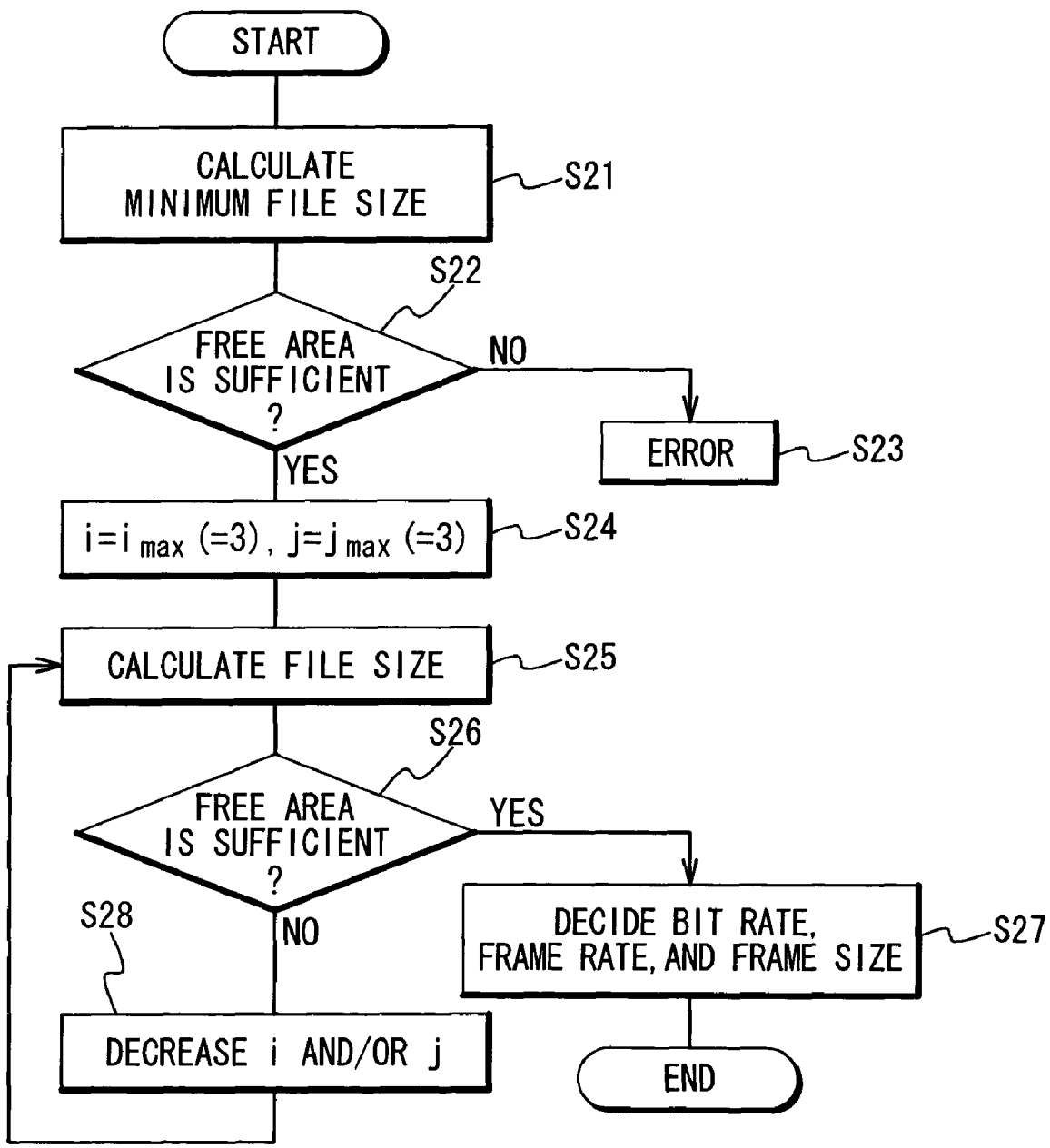
FIG. 4 is a flowchart illustrating a process of deciding a frame rate, a frame size, and a bit rate.

FIG. 4 illustrates an algorithm to decide the frame size, the frame rate, and the average bit rate of the compressed video image data 6 at Step S01. At Step S21, the encoder controller 2 calculates the minimum file size necessary for storing the compressed video image data 6 assuming that the compressed video image data 6 is generated so as to have an allowable low image quality. The minimum file size is calculated on the basis of the minimum allowable average bit rate. With reference to FIG. 2, the minimum allowable average bit rate is the smallest one of the average bit rates described in the compression parameter table 2*a*.

Referring back to FIG. 4, the calculated minimum file size is compared with the size of the free area of the recording medium 7 at Step S22. If the size of the free area of the recording medium 7 is smaller than the minimum file size, this disables the recording medium 7 for recording the compressed video image data 6. If so, the encoder controller 2 returns an error to the application 3, and fails to generate the compressed video image data 6 at Step S22.

If not so, the encoder controller 2 seeks the maximum average bit rate from among the potential average bit rates described in the compression parameter table 2*a* so that the file size of the compressed video image data 6 is smaller than the size of the free area of the recording medium 7. The seek of the average bit rate is executed in the descending order. After deciding the maximum average bit rate which reduces the file size of the compressed video image data 6 down to or below the size of the free area of the recording medium 7, the encoder controller 2 decides the frame size and frame rate of the compressed video image data 6 through data look-up of the compression parameter table 2*a*.

The encoder controller 2 uses a pair of variables i and j to decide the frame size, the frame rate, and the average bit rate of the compressed video image data 6. The variable i is a natural number equal to or less than $i_{max}$ which is the number of potential frame sizes, while the variable j is a natural number equal to or less than $j_{max}$ which is the number of potential frame rates. As shown in FIG. 2, $i_{max}$ and $j_{max}$ are three in this embodiment. As described later, the variable i is used to decide the frame size, while the variable j is used to decide the frame rate.

Deciding the frame size, the frame rate, and the average bit rate with the variables i and j begins with setting i and j to $i_{max}$ and $j_{max}$, respectively at Step S24. This implies that the variables i and j initially select the maximum average bit rate.

The encoder controller 2 then selects the average bit rate described in the row 8-*i* and column 9-*j*. The encoder controller 2 then calculates the file size of the compressed video image data 6 at Step S25 on the basis of the selected average bit rate and the number of the frames of the original video image data 5. After calculating the file size, the encoder controller 2 then determines at Step S26 if the calculated file size is equal to or smaller than the size of the free area of the recording medium 7.

If so, the encoder controller 2 decides to use the selected average bit rate to generate the compressed video image data 6. In this case, the encoder controller 2 decides to use the frame size and frame rate associated with the selected average bit rate by the compression parameter table 2*a* at Step S27. That is, the encoder controller 2 adopts the frame size associated with the row 8-*i* and the frame rate associated with the column 9-*j* to generate the compressed video image data 6.

If not so, the encoder controller 2 executes Step S25, and S26 after reducing one or both of the variables i and j at Step S28. This allows the encoder controller 2 to seek the average bit rate for reducing the file size of the compressed video image data 6 down to or below the size of the free area of the recording medium 7. The reduction of the variable j is given a priority over that of the variables i to allow the average bit rate to be sequentially reduced.

The procedure thus-described enables the encoder controller 2 to appropriately decide the average bit rate, frame size, and frame rate. It is of much importance that the average bit rate is firstly decided, and the frame size, and frame rate are then decided on the basis of the decided average bit rate. This effectively reduces degradation of the image quality. The preferable frame size and frame rate for improving the image quality is dependent on the average bit rate. For example, the reduction of the average bit rate with a constant frame size and frame rate causes degradation of the image quality. Deciding the frame size and frame rate on the basis of the average bit rate effectively reduces the degradation of the image quality of the compressed video image data 6.

Referring back to FIG. 3, after deciding the frame size, the frame rate, and the average bit rate of the compressed video image data 6, the encoder controller 2 provide the encoder 1 with the decided frame size, the frame rate, and the average bit rate at Step S02. The encoder controller 2 then opens a data file on the recording medium 7 for recording the compressed video image data 6 at Step S03.

The encoder controller 2 then provides the encoder 1 with the original video image data 5, and receives the compressed video image data 6 from the encoder 1 at Step S06. The encoder 1 generates the compressed video image data 6 so that the compressed video image data 6 has the frame size, the frame rate and the bit rate indicated by the encoder controller 2. The encoder controller 2 then stores the compressed video image data 6 in the file opened on the recording medium 7 at Step S05.

The encoder controller 2 then monitors the change in the size of the free area of the recording medium 7 at Step S06, the change caused by a factor other than storing the compressed video image data 6.

When detecting a change in the size of the free area of the recording medium 7 at Step S06, the encoder controller 2 redecides the frame size, the frame rate, and the average bit rate on the basis of the size of the free area of the recording medium 7, and the number of the remaining frames of the original video image data 5. The algorithm for redeciding the frame size, the frame rate, and the average bit rate is identical to that for firstly deciding them at Step S01. This algorithm decreases the average bit rate of the compressed video data 6 as the decrease of the size of the free area, and if necessary, decreases the frame size and frame rate as the decrease of the average bit rate. On the other hand, the algorithm increases the average bit rate of the compressed video image data 6 as the increase in the size of the free area, and if necessary, increases the frame size and frame rate as the increase in the average bit rate.

When at lease one of the frame size, the frame rate, and the average bit rate is modified at Step S09, the encoder controller 2 then provides the encoder 1 with the modified frame size, the frame rate, and the average bit rate at Step S10. From that time on, the encoder 1 uses the modified frame size, the frame rate, and the average bit rate. The encoder controller 2 then closes the file used for storing the compressed video image data 6, and open another file for storing the compressed video image data 6 thereafter at Step S11. The procedure then goes back to Step S04.

When none of the frame size, the frame rate, and the average bit rate is modified at Step S08, The procedure skips Step S10 and S11 to go back to Step S04.

When not detecting a change in the size of the free area of the recording medium 7 at Step S06, the encoder controller 2 determines at Step S07 whether the compression of all the frames of the original video image data 5 is successfully completed. Steps S04 through S11 are repeatedly executed till the compression of the original video image data 5 is completed.

As thus-described, the encoder controller 2 decides the average bit rate of the compressed vide image data 6 in response to the size of the free area of the recording medium 7 and the number of the frames of the original video image data 5, and then decides the frame size and frame rate of the compressed vide image data 6 on the basis of the average bit rate. This enables the optimization of the frame size, the frame rate, and the average bit rate so that the whole of the compressed video image data 6 is surely stored in the recording medium 7 while maintaining the image quality of the compressed video image data 6.

In this embodiment, the recording time of the original video image data 5 may be used in place of the number of the frames of the original video image data 5 for deciding the frame size, the frame rate, and the average bit rate of the compressed vide image data 6. The recording time of the original video image data 5 corresponds to the number of the frames, and thus the same goes for the recording time.

Also, the application 3 may substitute for the encoder controller 2. However, the provision of the encoder controller 2 preferably eliminates the need for the application 3 executing a special operation.

Second Embodiment

Figure 5:
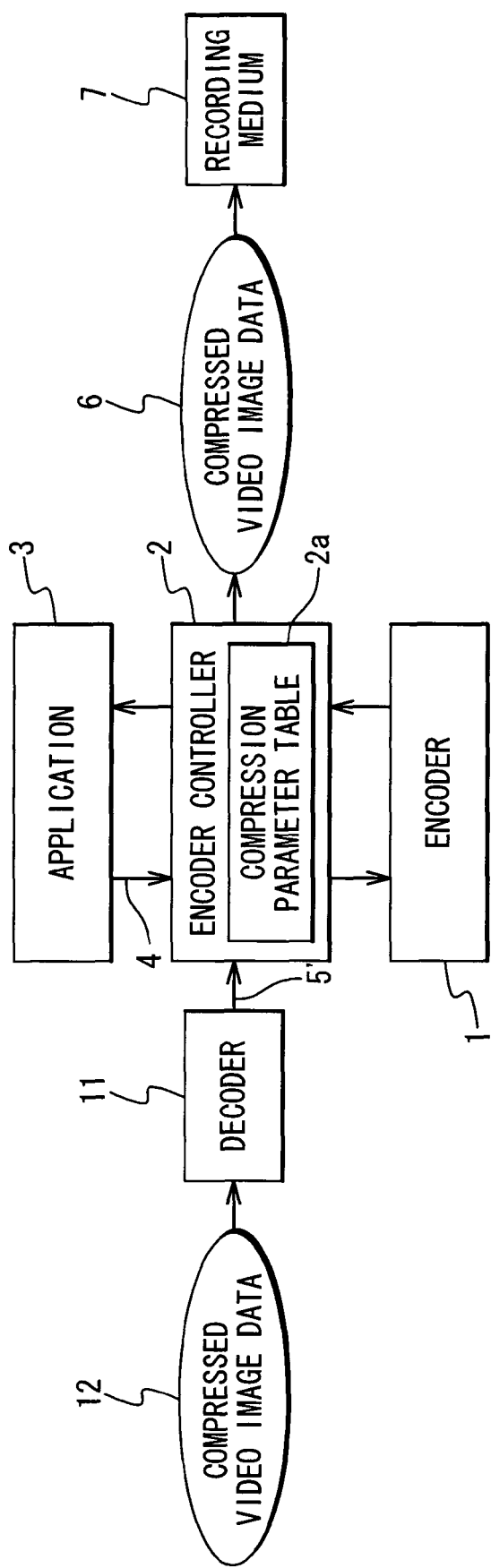
FIG. 5 shows a schematic block diagram of a video image data compression archiver in a second embodiment of the present invention.

FIG. 5 shows a video image data compression archiver in a second embodiment. In this embodiment, a decoder 11 receives and decodes a compressed video image data 12 to develop a decompressed video image data 5'. The encoder controller 2 provides the decompressed video image data 5' for the encoder 1 in place of the original video image data 5. The encoder 1 compresses the decompressed video image data 5' to develop the compressed video image data 6.

Figure 6:
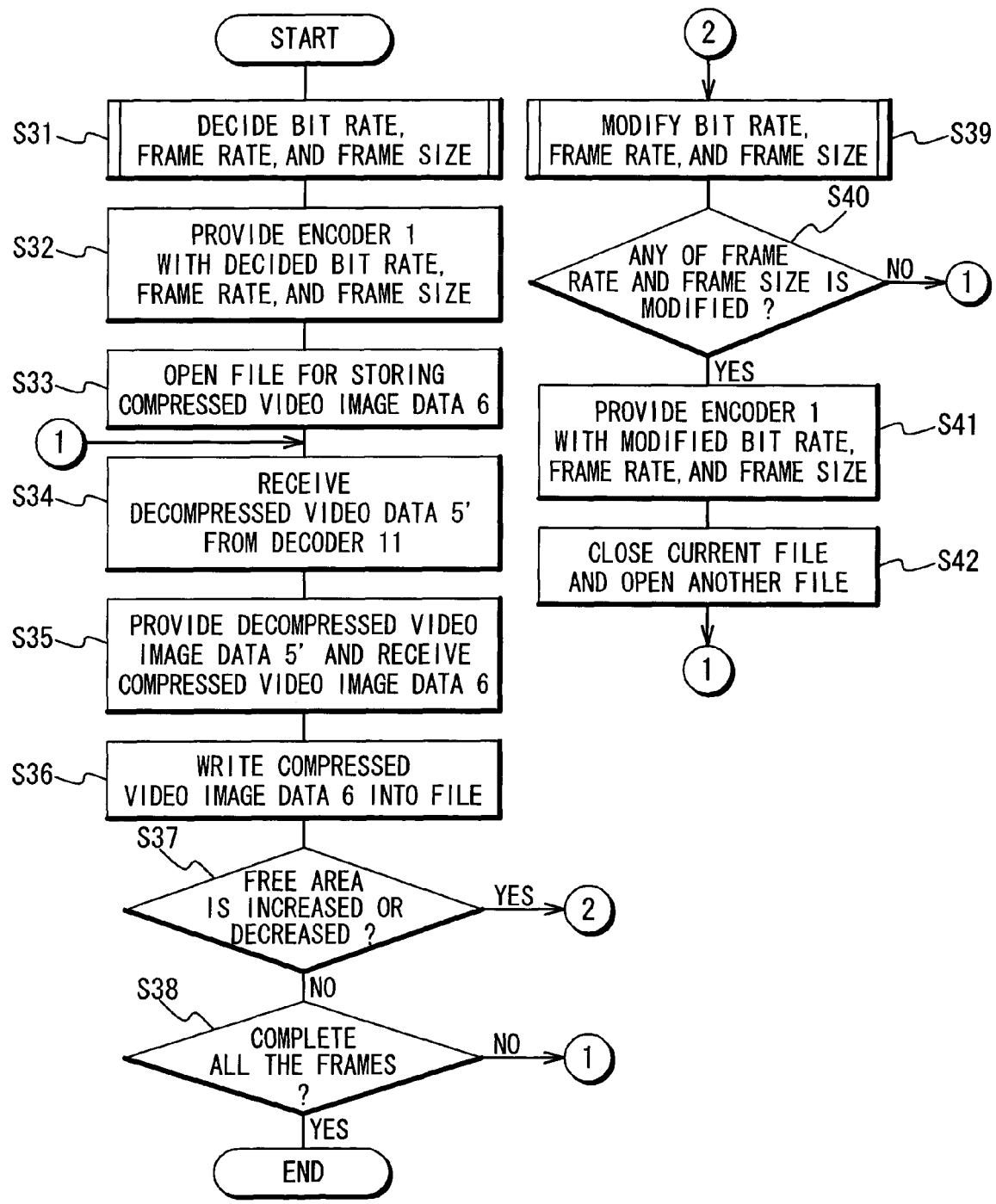
FIG. 6 is a flowchart illustrating an operation of the encoder controller 2 in the second embodiment.

FIG. 6 is a flowchart illustrating an operation of the video image data compression archiver in the second embodiment.

In response to the data compression request 4 from the application 3, the encoder controller 2 obtains the number of frames of the decompressed video image data 5' and the size of the free area of the recording medium 7. The encoder controller 2 then decides the frame size, the frame rate, and the average bit rate of the compressed video image data 6 on the basis of the obtained number of the frames and the size of the free area at Step S31. Deciding the frame size, the frame rate, and the average bit rate is achieved through the same procedure as that executed at Step S01 in the first embodiment.

After deciding the frame size, the frame rate, and the average bit rate, the encoder controller 2 then provides them for the encoder 1 at Step S32. The encoder controller 2 then opens a file for storing therein the compressed video image data 6 on the recording medium 7 at Step S33.

The decoder 11 then decompresses the video image data 12 to develop the decompressed video image data 5', and the encoder controller 2 receives the decompressed video image data 5' at Step S34. The encoder controller 2 provides the developed video image data 5 for the encoder 1, and receives the compressed video image data 6 from the encoder 1 at Step S35. The encoder 1 compresses the decompressed video image data 5' to develop the compressed video image data 6 so that the compressed video image data 6 has the frame size, the frame rate, and the bit rate indicated by the encoder controller 2. The encoder controller 2 receives the compressed video image data 6 to store it in the file opened on the recording medium 7 at Step S36.

The encoder controller 2 then monitors the change in the size of the free area of the recording medium 7 at Step S37, the change caused by a factor other than storing the compressed video image data 6.

When detecting a change in the size of the free area of the recording medium 7 at Step S37, the encoder controller 2 redecides the frame size, the frame rate, and the average bit rate on the basis of the size of the free area of the recording medium 7, and the number of the remaining frames of the original video image data 5 at Step S39. The algorithm for redeciding the frame size, the frame rate, and the average bit rate is identical to that for firstly deciding them at Step S01.

When at lease one of the frame size, the frame rate, and the average bit rate is modified at Step S40, the encoder controller 2 then provides the encoder 1 with the modified frame size, the frame rate, and the average bit rate at Step S41. From that time on, the encoder 1 uses the modified frame size, the frame rate, and the average bit rate. The encoder controller 2 then closes the file used for storing the compressed video image data 6, and open another file for storing the compressed video image data 6 thereafter at Step S42. The procedure then goes back to Step S34. When none of the frame size, the frame rate, and the average bit rate is modified at Step S39, the procedure skips Step S41 and S42 to go back to Step S34.

When not detecting a change in the size of the free area of the recording medium 7 at Step S37, the encoder controller 2 determines at Step S38 whether the compression of all the frames of the original video image data 5 is successfully completed. Steps S34 through S42 are repeatedly executed till the compression of the original video image data 5 is completed.

As thus described in this embodiment, the encoder controller 2 decides the average bit rate of the compressed vide image data 6 in response to the size of the free area of the recording medium 7 and the number of the frames of the decompressed video image data 5', and then decides the frame size and frame rate of the compressed vide image data 6 on the basis of the average bit rate. This enables the optimization of the frame size, the frame rate, and the average bit rate so that the whole of the compressed video image data 6 is surely stored in the recording medium 7 while maintaining the image quality of the compressed video image data 6.

Third Embodiment

Figure 7:
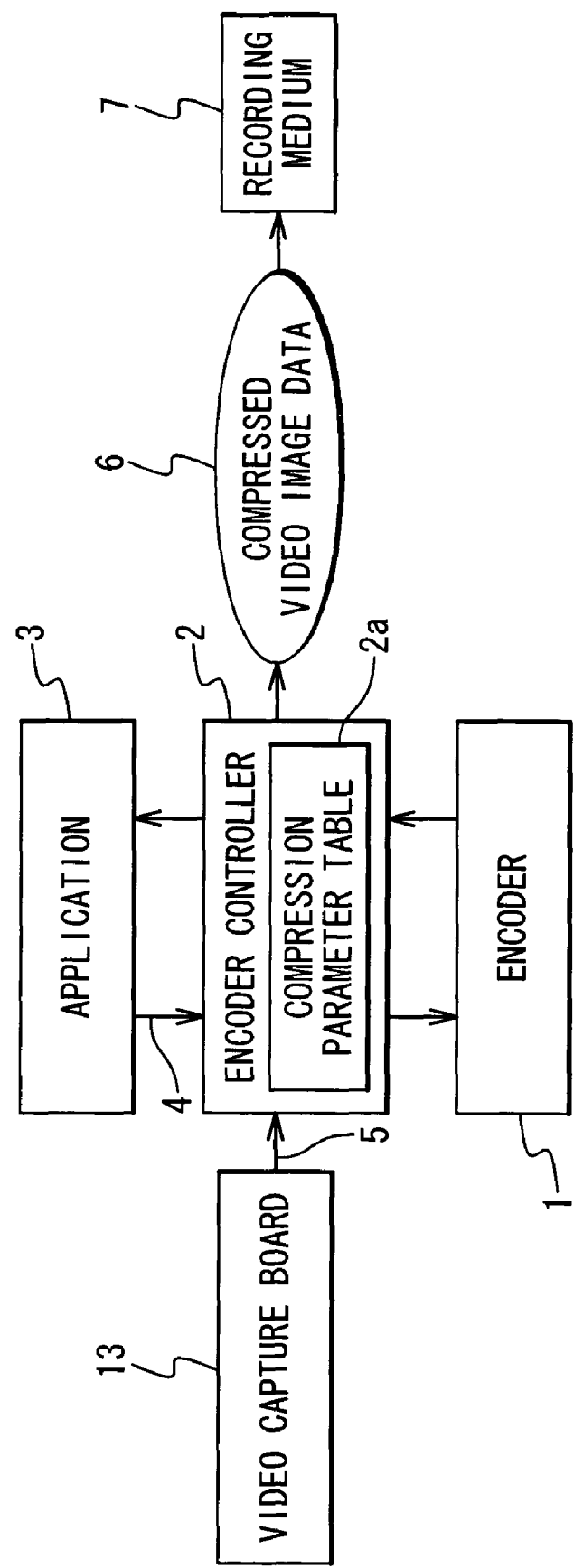
FIG. 7 shows a schematic block diagram of a video image data compression archiver in a third embodiment of the present invention.

FIG. 7 shows a video image data compression archiver in a third embodiment. The video image data compression archiver in the third embodiment, is similar to that in the first embodiment. In this embodiment, however, the video image data compression archiver is used to compress and store the video image data obtained by recording a TV program. In detail, the video image data 5 is developed by a video capture board 13. The video capture board 13 captures a video signal and an audio signal of the TV program to develop the video image data 5. The video and audio signals may be digital or analogue. In this embodiment, the recording time of the video image data 5 is used for the control of the encoder 1 in place of the number of the frames of the video capture board 13.

Figure 8:
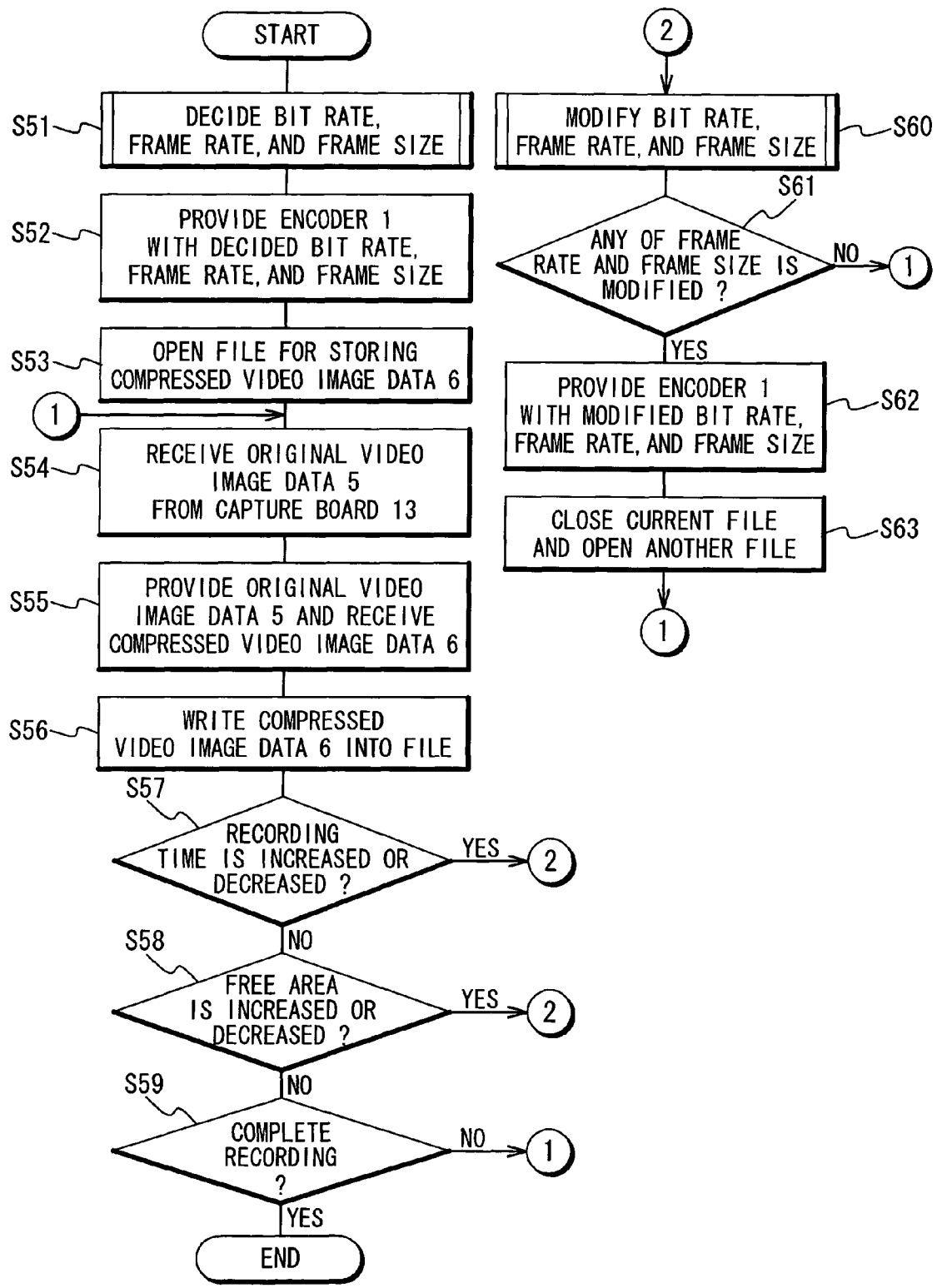
FIG. 8 is a flowchart illustrating an operation of the encoder controller 2 in the third embodiment.

FIG. 8 shows a flowchart illustrating the operation of the video image compression archiver in the third embodiment.

In response to the data compression request 4 from the application 3, the encoder controller 2 obtains the recording time 5 of the video image data 5 and the size of the free area of the recording medium 7. The encoder controller 2 then decides the frame size, the frame rate, and the average bit rate of the compressed video image data 6 on the basis of the obtained recording time and size of the free area at Step S51. Deciding the frame size, the frame rate, and the average bit rate is achieved through the same procedure as that executed at Step S01 in the first embodiment except for that the recording time of the video image data 5 is used in place of the number of the frames.

After deciding the frame size, the frame rate, and the average bit rate, the encoder controller 2 then provides them for the encoder 1 at Step S52. The encoder controller 2 then opens a file for storing therein the compressed video image data 6 on the recording medium 7 at Step S53.

The video capture board 13 then captures the video signal and the audio signal to develop the video image data 5, and the encoder controller 2 receives the developed video image data 5 at Step S54. The encoder controller 2 provides the developed video image data 5 for the encoder 1, and receives the compressed video image data 6 from the encoder 1 at Step S55. The encoder 1 receives and compresses the video image data 5 to develop the compressed video image data 6 so that the compressed video image data 6 has the frame size, the frame rate, and the bit rate indicated by the encoder controller 2. The encoder controller 2 receives the compressed video image data 6 to store it in the file opened on the recording medium 7 at Step S56.

The encoder controller 2 then monitors the change in the recording time of the video image data 5 at Step S57. In the event that the video image data 5 is video image data of a broadcast of a baseball game, for example, the recording time of the video image data 5 is prolonged by the broadcast being extended, which may be caused by extra innings. The encoder controller 2 detects the change in the recording time of the video image data 5.

In addition, the encoder controller 2 monitors the change in the size of the free area of the recording medium 7 at Step S58, the change caused by a factor other than storing the compressed video image data 6.

When detecting a change in at least one of the recording time of the vide image data 5 and the size of the free area of the recording medium 7, the encoder controller 2 redecides the frame size, the frame rate, and the average bit rate on the basis of the size of the free area of the recording medium 7, and the remaining recording time of the video image data 5 at Step S60. The algorithm for redeciding the frame size, the frame rate, and the average bit rate is identical to that for firstly deciding them at Step S01 in the first embodiment.

When at lease one of the frame size, the frame rate, and the average bit rate is modified at Step S61, the encoder controller 2 then provides the encoder 1 with the modified frame size, the frame rate, and the average bit rate at Step S62. From that time on, the encoder 1 uses the modified frame size, the frame rate, and the average bit rate. The encoder controller 2 then closes the file used for storing the compressed video image data 6, and open another file for storing the compressed video image data 6 thereafter at Step S63. The procedure then goes back to Step S54. When none of the frame size, the frame rate, and the average bit rate is modified at Step S60, the procedure skips Step S62 and S63 to go back to Step S54.

When detecting a change in none of the recording time and the size of the free area at Steps S57 and S58, the encoder controller 2 determines at Step S59 whether the recording of the video image data 5 is successfully completed. Steps S51 through S63 are repeatedly executed till the recording of the video image data 5 is completed.

Figure 9:
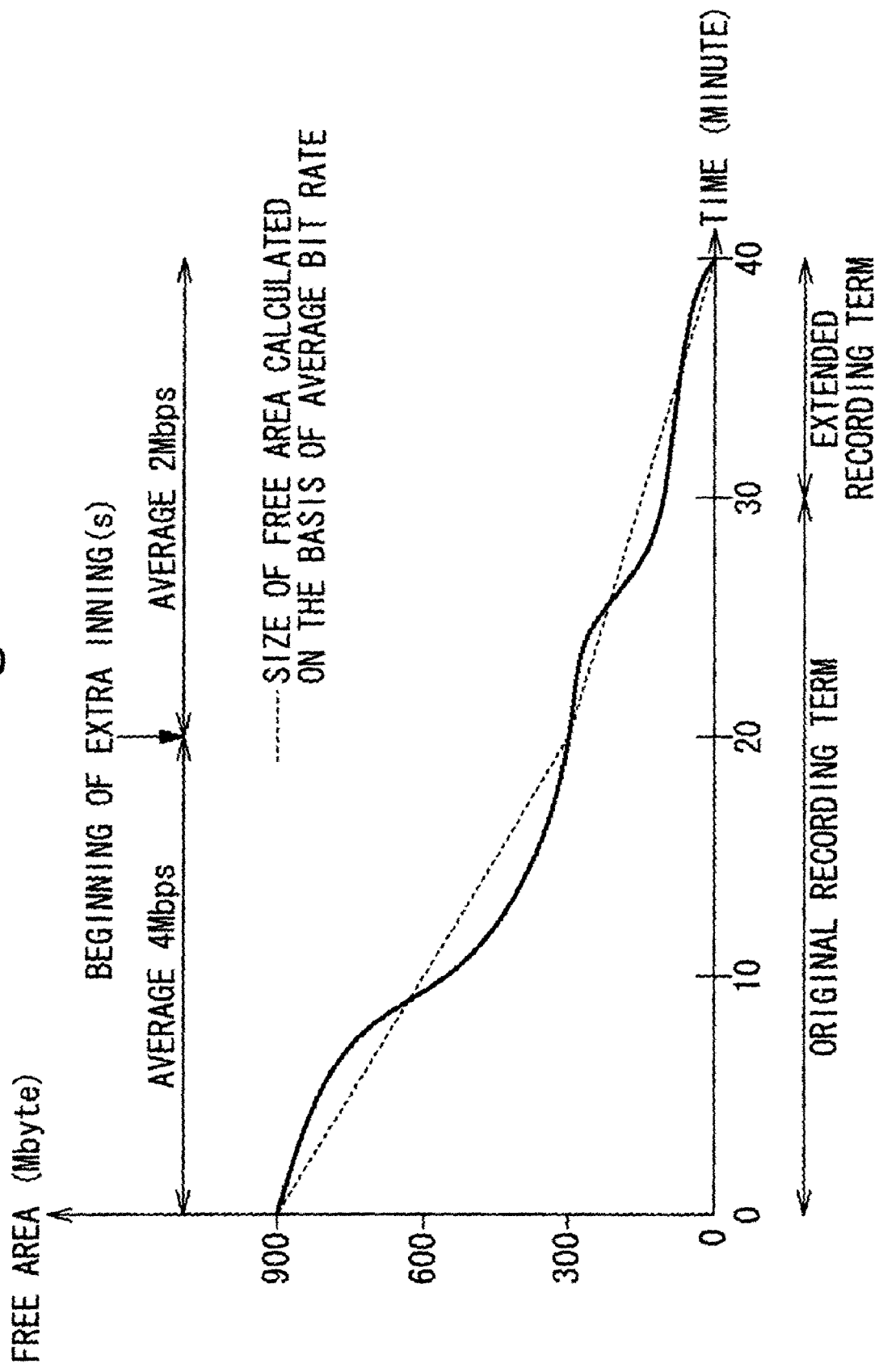
FIG. 9 illustrates a change in the size of the free area of the recording medium 7 when the recording time is suddenly increased.

FIG. 9 is a graph illustrating an exemplary operation of the video image data compression archiver in the third embodiment. The graph shows a change in the size of the free area of the recording medium 7 in the event that the free area of the recording medium 7 is initially 900 Mbyte, the recording time is initially set to 30 minutes, and then is extended by 10 minutes, 20 minutes after the start of the recording.

When the recording is started, the preferable average bit rate is defined on the basis of the size of the free area and the recording time by the following formula:

$$R_{ini} = V_{ini} / T_{ini}$$
$$= (900 \times 8)(\text{Mbit})/(30 \times 60)(s),$$
$$= 4.0 \text{ (Mbps)},$$

where $R_{ini}$ is the initial average bit rate, $V_{ini}$ is the initial size of the free area, and T is the initial recording time. It should be noted that the average bit rate is calculated under the assumption that the video image data 5 includes video data and audio data.

When the recording time is extended by 10 minutes, the preferable average bit rate is redefined by the following formula:

$$R_{red} = \{V_{ini} - (T \times R_{ini})\} / (T_{rem} + T_{ext}),$$
$$= \{900 \times 8 - (20 \times 60 \times 4.0)\}(\text{Mbit})/[\{(30-20)+10\} \times 60],$$
$$= 2.0 \text{ (Mbps)},$$

where $R_{red}$ is the redefined average bit rate, T is the elapsed recording time, $T_{rem}$ is the remaining recording time, and $T_{ext}$ is the extra recording time.

These formulae indicate that the compressed video image data 6 storable in the recording medium 7 is obtained by developing the compressed video image data 6 at the average bit rate of 2.0 (Mbps) for 10 minute after developing it at the average bit rate of 4.0 (Mbps) for 20 minutes.

FIG. 10 is a graph illustrating another exemplary operation of the video image data compression archiver. The graph shows a change in the size of the free area of the recording medium 7 in the event that the free area of the recording medium 7 is initially 450 Mbyte, the recording time is 30 minutes, and the free area is increased by 75 Mbyte, 20 minutes after the start of the recording, because of the delete of an unnecessary file in the recording medium 7.

The preferable average bit rate is initially defined on the basis of the size of the free area and the recording time by the following formula:

$$R_{ini} = V_{ini} / T_{ini}$$
$$= (450 \times 8)(\text{Mbit}) / (30 \times 60)(s),$$
$$= 2.0 \text{ (Mbps)},$$

When the free area is increased by 75 Mbyte, the preferable average bit rate is redefined by the following formula:

$$R_{red} = \{V_{ini} - (T \times R_{ini}) + V_{inc}\} / T_{rem},$$
$$= \{450 \times 8 - (20 \times 60 \times 2.0) + 75 \times 8\} / \{(30 - 20) \times 60\},$$
$$= 3.0 \text{ (Mbps)},$$

where $V_{inc}$ is the increased size of the free area. These formulae indicate that the compressed video image data 6 storable in the recording medium 7 is obtained by developing the compressed video image data 6 at the average bit rate of 3.0 (Mbps) for 10 minute after developing it at the average bit rate of 2.0 (Mbps) for 20 minutes.

The same goes for the case that a plurality of TV programs are recorded in the recording medium 7. In this case, the free area of the recording medium 7 is divided into a plurality of areas, and the areas are respectively allocated to the TV programs. The size of each area is proportionally determined on the basis of the recording time of each TV program. The average bit rate is decided so that each TV program is surely stored in the associated area. In the event that two TV programs of 60 minutes and 30 minutes are recorded in the recording medium 7 of 1800 Mbyte, for example, the size of the area allocated to each TV program is given by:

$$V_{60} = 1800 \text{ (Mbyte)} \times 60 \text{ (min.)} / (60 + 30)(\text{min.})$$
$$= 1200 \text{ (Mbyte)},$$
$$V_{30} = 1800 \text{ (Mbyte)} \times 30 \text{ (min.)} / (60 + 30)(\text{min.})$$
$$= 600 \text{ (Mbyte)}.$$

where $V_{60}$ is the size of the area allocated to the TV program of 60 minutes, and $V_{30}$ is that of the area allocated to the TV program of 30 minutes.

A piece of the compressed video image data 6 may be include two TV programs. For example, the same process as that for generating the compressed video image data 6 to record a 90-minute TV program may be used for recording a first TV program of 60 minutes and a second TV program of 30 minutes in a recording medium 7. Provided the recording medium 7 has a free area of 1800 Mbyte, the preferable average bit rate $R_{ini}$ is initially defined by the following formula:

$$R_{ini} = V_{ini} / T_{ini},$$
$$= (1800 \times 8)(\text{Mbit}) / \{(60 + 30) \times 60\}(s),$$
$$\cong 2.6 \text{ (Mbps)}.$$

In the event that the second TV program is extended by 30 minutes, 20 minutes after the 60-minute TV program starts to be recorded, the preferable average bit rate $R_{red}$ is redefined by the following formula:

$$R_{red} = \{V_{ini} - (T \times R_{ini})\} / (T_{rem} + T_{ext}),$$
$$= \{1800 \times 8 - (20 \times 60 \times 2.6)\} (\text{Mbit}) / [\{(90 - 20) + 30\} \times 60],$$
$$\cong 1.8 \text{ (Mbps)}.$$

This formula indicates that the compressed video image data 6 storable in the recording medium 7 is obtained by firstly recording the first TV program at the average bit rate of 2.6 Mbps for 20 minutes, and then recording the first TV program at the average bit rate of 1.8 Mbps for 40 minutes, and finally recording the second TV program at the average bit rate of 1.8 Mbps to develop the compressed video image data 6.

As thus described in this embodiment, the encoder controller 2 decides the average bit rate of the compressed vide image data 6 in response to the size of the free area of the recording medium 7 and the number of the frames of the decompressed video image data 5', and then decides the frame size and frame rate of the compressed vide image data 6 on the basis of the average bit rate. This enables the optimization of the frame size, the frame rate, and the average bit rate so that the whole of the compressed video image data 6 is surely stored in the recording medium 7 while maintaining the image quality of the compressed video image data 6.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A video image data compression archiver comprising:
an encoder compressing non-compressed video image data to generate compressed video image data; and
an encoder controller which monitors a size of a free area of a recording medium for recoding said compressed video image data and automatically adjusts a frame size, a frame rate, and an average bit rate of said compressed video image data based on the monitored size of the free area in response to changes to the free area of the recording medium, said adjusting occurring throughout said compressing of said non-compressed video image data, wherein the encoder controller adjusts said frame size, said frame rate, and said average bit rate to generate said compressed video image data having an increased image quality when the monitored size of the free area is increased during said compressing of said non-compressed video image data.

2. The video image data archiver according to claim 1, wherein said encoder controller decides said average bit rate in response to said at least one parameter, and decides said frame size and said frame rate based on said average bit rate.

3. The video image data archiver according to claim 1, wherein said encoder controller monitors said free area of said recording medium, and modifies at least one of said frame size, said frame rate, and said average bit rate when detecting a change in said free area of said recording medium.

4. The video image data archiver according to claim 3, wherein said encoder controller decreases at least one of said of said frame size, said frame rate, and said average bit rate when detecting a decreases in said free area of said recording medium.

5. The video image data archiver according to claim 3, wherein said encoder controller increases at least one of said frame size, said frame rate, and said average bit rate when detecting an increase in said free area of said recording medium.

6. The video image data archiver according to claim 1, wherein said encoder controller monitors said number of said frames of said non-compressed video image data, and modifies at least one of said frame size, said frame rate, and said average bit rate, when detecting a change in said number of said frames of said non-compressed video image data.

7. The video image data archiver according to claim 6, wherein said encoder controller decreases at least one of said frame size, said frame rate, and said average bit rate, when detecting an increase in said number of said frames of said non-compressed video image data.

8. The video image data archiver according to claim 6, wherein said encoder controller increases at least one of said frame size, said frame rate, and said average bit rate, when detecting a decrease in said number of said frames of said non-compressed video image data.

9. The video image data archiver according to claim 1, wherein said encoder controller monitors said recording time of said non-compressed video image data, and modifies at least one of said frame size, said frame rate, and said average bit rate when detecting a change in said recording time.

10. The video image data archiver according to claim 9, wherein said encoder controller decreases at least one of said frame size, said frame rate, and said average bit rate when detecting an increase in said recording time of said original video image.

11. The video image data archiver according to claim 9, wherein said encoder controller increases at least one of said frame size, said frame rate, and said average bit rate when detecting a decrease in said recording time of said original video image.

12. A video image data compression archiver comprising:
an encoder compressing non-compressed video image data to generate compressed video image data; and
an encoder controller which monitors a size of a free area of a recording medium for recoding said compressed video image data and automatically adjusts a frame size, and an average bit rate of said compressed video image data based on the monitored size of the free area in response to changes to the free area of the recording medium, said adjusting occurring throughout said compressing of said non-compressed video image data,
wherein the encoder controller adjusts said frame size, and said average bit rate to generate said compressed video image data having an increased image quality when the monitored size of the free area is increased during said compressing of said non-compressed video image data.

13. The video image data archiver according to claim 12, wherein said encoder controller decides said average bit rate in response to said at least one parameter, and decides said frame size based on said average bit rate.

14. The video image data archiver according to claim 12, wherein said encoder controller monitors said free area of said recording medium, and modifies at least one of said frame size, and said average bit rate when detecting a change in said free area of said recording medium.

15. The video image data archiver according to claim 12, wherein said encoder controller monitors said number of said frames of said non-compressed video image data, and modifies at least one of said frame size, and said average bit rate when detecting a change in said number of said frames of said non-compressed video image data.

16. The video image data archiver according to claim 12, wherein said encoder controller monitors said recording time of said frames of said non-compressed video image data, and modifies at least one of said frame size, and said average bit rate when detecting a change in said recording time of said non-compressed video image data.

17. A video image data compression archiver comprising:
an encoder compressing non-compressed video image data to generate compressed video image data; and
an encoder controller which monitors a size of a free area of a recording medium for recoding said compressed video image data and automatically adjusts a frame rate, and an average bit rate of said compressed video image data based on the monitored size of the free area in response to changes to the free area of the recording medium, said adjusting occurring throughout said compressing of said non-compressed video image data,
wherein the encoder controller adjusts said frame rate, and said average bit rate to generate said compressed video image data having an increased image quality when the monitored size of the free area is increased during said compressing of said non-compressed video image data.

18. The video image data archiver according to claim 17, wherein said encoder controller decides said average bit rate in response to said at least one parameter, and decides said frame rate based on said average bit rate.

19. The video image data archiver according to claim 17, wherein said encoder controller monitors said free area of said recording medium, and modifies at least one of said frame rate, and said average bit rate, when detecting a change in said free area of said recording medium.

20. The video image data archiver according to claim 17, wherein said encoder controller monitors said number of said frames of said non-compressed video image data, and modifies at least one of said frame rate, and said average bit rate, when detecting a change in said number of said frames of said non-compressed video image data.

21. The video image data archiver according to claim 17, wherein said encoder controller monitors said recording time of said frames of said non-compressed video image data, and modifies at least one of said frame rate, and said average bit rate, when detecting a change in said recording time of said non-compressed video image data.

22. A method for archiving video image data comprising:
compressing non-compressed video image data to generate compressed video image data;
recording said compressed video image data in a recording medium; and
monitoring a size of a free area of the recording medium for recoding said compressed video image data;
adjusting automatically an average bit rate, a frame size, and a frame rate of said compressed video image data based on the monitored size of the free area in response to changes to the free area of the recording medium, said adjusting occurring throughout said compressing of said non-compressed video image data, wherein said average bit rate, said frame size, and said frame rate are adjusted to obtain an increased image quality when the monitored size of the free area is increased during said compressing of said non-compressed video image data.

23. The method according to claim 22, wherein said controlling includes deciding said frame size and said frame rate based on said average bit rate.

24. A method for archiving video image data comprising:
compressing non-compressed video image data to generate compressed video image data;
recording said compressed video image data in a recording medium; and
monitoring a size of a free area of the recording medium for recoding said compressed video image data;
adjusting automatically an average bit rate, and a frame size of said compressed video image data based on the monitored size of the free area in response to changes to the free area of the recording medium, said adjusting occurring throughout said compressing of said non-compressed video image data,
wherein said average bit rate and said frame size are adjusted to obtain an increased image quality when the monitored size of the free area is increased during said compressing of said non-compressed video image data.

25. The method according to claim 24, wherein said controlling includes deciding said frame size based on said average bit rate.

26. A method for archiving video image data comprising:
compressing non-compressed video image data to generate compressed video image data;
recording said compressed video image data in a recording medium; and
monitoring a size of a free area of the recording medium for recoding said compressed video image data;
adjusting automatically an average bit rate, and a frame rate of said compressed video image data based on the monitored size of the free area in response to changes to the free area of the recording medium, said adjusting occurring throughout said compressing of said non-compressed video image data,
wherein said average bit rate and said frame rate are adjusted to obtain an increased image quality when the monitored size of the free area is increased during said compressing of said non-compressed video image data.

27. The method according to claim 26, wherein said controlling includes deciding said frame rate based on said average bit rate.

* * * * *